Dec. 4, 1945.　　　W. A. BALDWIN　　　2,390,049
AIR BRAKE
Filed Jan. 8, 1945
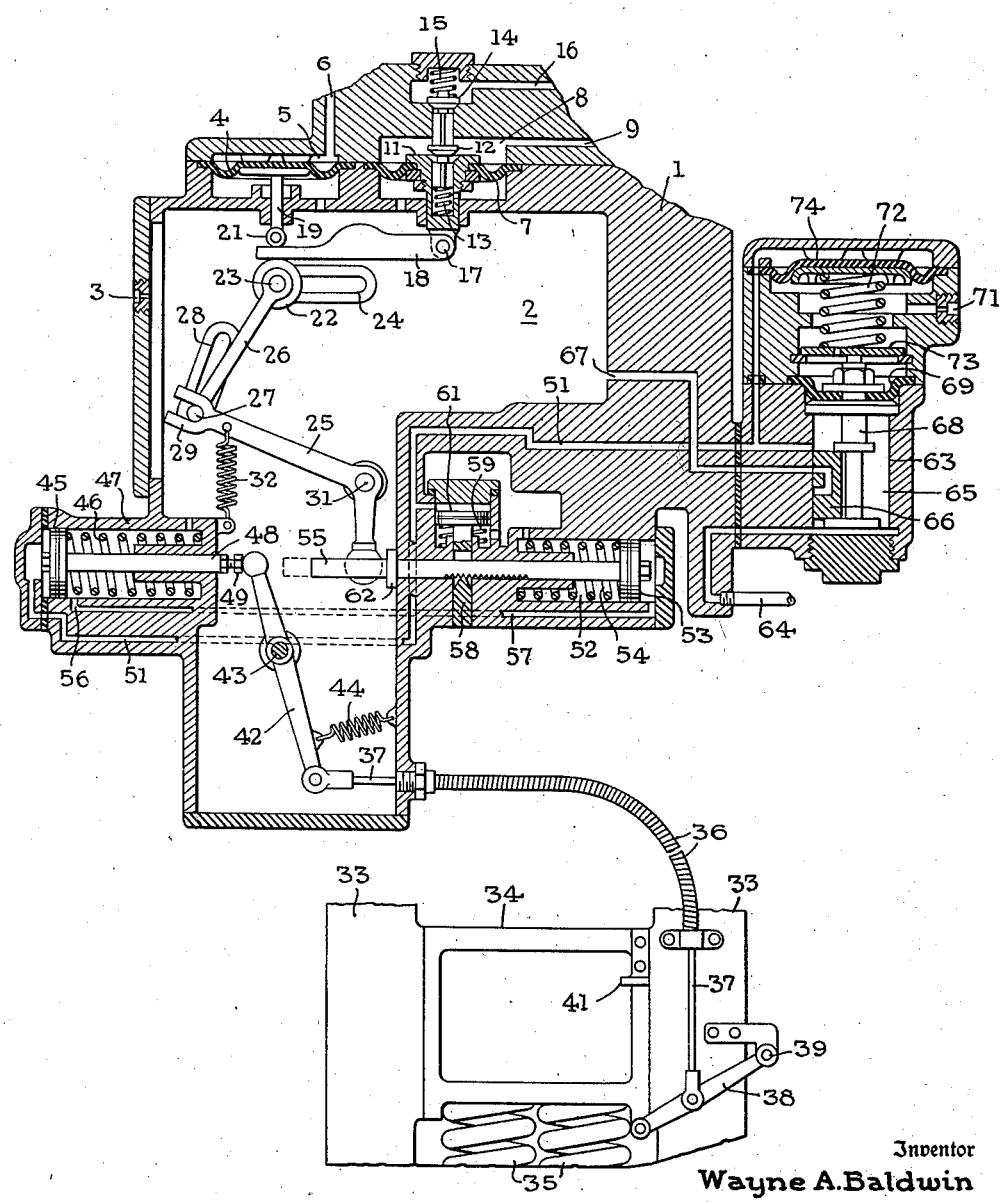
Inventor
Wayne A. Baldwin
By Dodge & Ostrolenk
Attorneys Patented Dec. 4, 1945

2,390,049

UNITED STATES PATENT OFFICE 2,390,049

AIR BRAKE

Wayne A. Baldwin, Watertown, N. Y., assignor to The New York Air Brake Company, a corporation of New Jersey Application January 8, 1945, Serial No. 571,803

4 Claims. (Cl. 303—22)

This invention relates to variable load brakes and particularly to a load sensing mechanism.

The invention provides a device of this character which permits a variable load mechanism on a car body to be adjusted according to the depression of a truck spring under load. The invention permits use of a Bowden wire under such conditions that the wire is not subject to undue wear. Accuracy is enhanced because the wire acts in tension.

An important aspect of the device is that all the above characteristics are attained in a simple device that moves to no-load position as an incident to each load sensing operation. As has been the practice in empty-and-load brakes the load is sensed when the brake pipe is recharged after being vented. Thus it occurs when the train is at rest, the device retreating to an inactive position when the train is in motion.

The invention will be described as embodied with an empty-and-load brake mechanism, features of which form the subject of patent applications by H. N. Sudduth Ser. No. 565,130 filed November 25, 1944, and Lynn Pickert Ser. No. 567,337 filed December 9, 1944.

In the drawing, the single view is a sectional view of the improved load sensing means associated with the adjustable elements of a variable ratio relay.

The housing of the variable ratio relay valve mechanism is indicated at 1 and includes an enclosing chamber 2 for the adjusting mechanism. This chamber is vented to atmosphere at 3.

A diaphragm 4 is subject on its upper side to pressure in chamber 5 and on its lower side to atmospheric pressure. The pressure in chamber 5 is the controlling pressure of the relay. Hence chamber 5 is connected by passage 6 to some source of controlling pressure which in the applications identified is a so-called light brake cylinder operated by a control valve of the AB type.

A second similar and adjacent diaphragm 7 is subject on its upper side to pressure in chamber 8 connected by passage 9 with the device to be controlled. The lower side of diaphragm 7 is subject to atmospheric pressure. In the identified applications the controlled device connected to passage 9 is a so-called load brake cylinder, and the relay valve functions to establish in the load cylinder pressures which are proportionally related to pressures in the light cylinder, the proportion being determined by adjustment of the relay.

Diaphragm 7 carries at its center a hub 11 on which is mounted a poppet type exhaust valve 12 biased in an opening direction (upward) by a coil compression spring 13. The valve 12 controls flow from chamber 8 through the diaphragm and is in thrust relation with the pilot of an inlet poppet valve 14 biased in a closing direction (downward) by a coil compression spring 15. Passage 16 is connected with a source of air under pressure. Upward motion of the diaphragm first closes exhaust valve 12 and then opens supply valve 14, increasing pressure in chamber 8 and any connected device. Downward motion first allows the supply valve to close and then causes the exhaust valve to open.

The hub 11 is hinged at 17 to one end of lever 18. Diaphragm 4 reacts downward on the other end of lever 18 through a thrust member 19 with roller 21. The fulcrum for the lever 18 is shiftable to vary the ratio and takes the form of a roller 22 whose journal 23 is guided by guideway 24. The limiting position to the left is directly under thrust member 19 and that to the right is preferably at mid length of the lever.

The fulcrum roller 22 is shifted by a bell crank 25 whose position is controlled by the load sensing mechanism. The connection takes the form of a link 26 connected to journal 23 and having at its other end a pin 27 which is guided in a guide 28 and engaged by a radial fork 29 at the end of one of the arms of bell crank 25. The bell crank 25 is fulcrumed at 31, and the parts are biased to no load position (shown in the drawing) by a spring 32 shown as reacting upon the bell crank.

As explained best in the Pickert application this linkage can be arranged to cause the pressure ratio effected by the relay to vary in direct proportion to displacement of the bell crank.

The mechanism so far described is simply one variable relay mechanism with which the feeler mechanism forming the subject of the present application may be used.

It will be understood that the housing 1 would be mounted on the freight car body or frame, and since the spring suspension for the car is exclusively in the bogie trucks, it is necessary to sense the load at a point on a truck.

The problem solved by the invention is to adjust the position of the lever 25 in relation to the load on one of the trucks.

The parts 33 are the pedestals of a truck viewed in side elevation and the part 34 is the bolster viewed in end elevation. The springs 35 support the bolster on the truck frame and consequently the bolster 34 moves downward relatively to the pedestals 33 as the load on the car is increased.

A flexible tubular casing 36 is attached at one end to the housing 1 and at the other end to one of the pedestals 33. It houses a flexible push-pull wire 37. The lower end of wire 37 is pinned to a feeler lever 38, fulcrumed at 39 on the pedestal and capable of being drawn up until it engages a lug 41 on the bolster 34. The distance it can be so drawn up diminishes as the load on the car is increased.

The upper end of wire 37 is pinned to a lever 42 which is fulcrumed near its middle on a journal 43 carried by the housing 1. The wire is biased to the position shown by a tension spring 44 which is located in the housing 1 rather than on pedestal 33 simply to protect it against damage.

A single acting piston 45 with return spring 46 and cylinder 47 operates a push rod 48. This carries an adjustable head 49 which engages the upper end of lever 42 and forces it out as far as the lug 41 permits. This action occurs when passage 51 is put under pressure by means to be described.

Axially aligned with cylinder 47 is a somewhat smaller cylinder 52 in which a piston 53 may be forced out against a return spring 54 until the end of its rod 55 engages the end of lever 42. Air to actuate piston 53 is delivered through a side port 56 in cylinder 47 to a passage 57 which leads to the head end of cylinder 52. This assures that piston 45 must move at least a short distance before piston 53 can be energized. This is idle motion of piston 45 necessary to reach full load position. It times the piston so that piston 45 moves before piston 53 moves, and serves as a safeguard in the event that piston 45 or wire 37 or related parts should fail to function. In such case piston 53 will retreat to no load position when unlatched by the latch described below.

Rod 55 is toothed and may be latched by a latch 58 held normally engaged by a spring 59 and releasable by a piston 61 which is subject to pressure in passage 51.

A collar 62 on rod 55 engages one forked end of bell crank 25.

To develop pressure in passage 51 and then vent that passage all during initial charging of the brake pipe, use is made of a cutoff valve which is the mechanism housed in chamber 63.

The pipe 64 represents a branch leading from the brake pipe and the brake pipe of course is the automatic brake pipe which leads from end to end of the train. This pipe is normally charged, the pressure in the brake pipe being reduced to cause applications of the brakes. The brake pipe is completely vented when cars are cut out of a train and whenever emergency applications are made.

The pipe 64 leads to a valve chamber 65 in the housing 63. In the chamber 65 is a seat for a slide valve 66. The passage 51 terminates in this seat and the seat is further provided with an exhaust passage 67. The slide valve 66 has a cavity as shown and is so dimensioned that in its lower position it exposes passage 51 and blanks exhaust passage 67, while in its upper position it connects the passages 51 and 67.

The valve 66 is shifted by a stem 68 attached to the center of flexible diaphragm 69. This is subject on its upper side to atmospheric pressure, (see port 71) and on its lower side to pressure in the chamber 65. The diaphragm is biased downward by a coil compression spring 72 which reacts through a shiftable plate 73. The stress on the spring 72 is increased when passage 51 is under pressure by a diaphragm 74 which serves as a spring seat for the spring 72 and is subject on its upper side to the pressure existing in passage 51.

*Operation*

Assume that the brake pipe is completely vented in which case the connection 64 would be vented. There are several circumstances under which this would be the case and under these conditions the train would be at rest either as the result of an emergency application (since these are not released until the train stops) or because the car had been cut out for switching operations. It is immaterial whether the brake system is or is not charged and immaterial what the position of the fulcrum 22 may be at that time.

Assume that pressure is now developed in the brake pipe and consequently in connection 64. Disregarding what happens in the AB brake valve (not illustrated) the immediate effect as to the variable load mechanism is a rise of pressure in the valve chamber 65 of the cutoff valve 63. Slide valve 66 would remain in its lowermost position as shown in the drawing because the spring 72 even with the diaphragm 74 not heavily loaded has sufficient strength to oppose a pressure of say 15 lbs. per square inch acting upward on diaphragm 69.

Consequently the passage 51 would be exposed to pressure so that pressure would develop to the left of the feeler piston 45 and above the latch piston 61. When the pressure is sufficient to overcome spring 46 the piston 45 will start outward and ultimately will reach a position fixed by collision of lever 38 with lug 41. Before this position is reached, the side port 56 will be exposed and the latch 58 will have been released by its piston 61. Release of the latch permits the piston 53 to move to its extreme righthand position, but ultimately flow of air through passage 57 will cause this piston to move out to the left until the end of rod 55 is arrested by collision with the upper end of lever 42. Since the piston 45 is larger and hence dominant, the bell crank lever 25 and the fulcrum roller 22 will be positioned according to the position of lug 41 on bolster 34.

Before a brake releasing pressure is reached in the pipe 64 and say at 35 lbs. per square inch, the diaphragm 69 and the connected valve 66 will have moved upward far enough to connect passage 51 with release passage 67. At that time the pressure in the space above the diaphragm 74 which had risen with pressure in passage 51 will be vented so that the stress on spring 72 will be partially relieved. This establishes a condition in which valve 66 will remain its uppermost position through all service reductions of brake pipe pressure.

The venting of passage 51 entails the venting of the space above latch piston 61 so that the latch 58 immediately reengages, after which the cylinder 47 and finally the cylinder 52 are vented. The piston 53 cannot retreat because it is latched but the piston 45 does retreat permitting the spring 44 to restore the feeler mechanism to the position shown in the drawing so that lever 38 is out of the path of lug 41. In this way the fulcrum roller 22 is adjusted according to the load on the car at the time the brake pipe is charged and is latched in such adjusted position, after which the feeler mechanism moves to an inactive position in which it is not subject to wear.

While the invention was developed for use with the Sudduth and Pickert concepts, and while one embodiment has been described in considerable detail in compliance with the requirements of the statutes, the illustrated embodiment is exemplary and the mechanism is generally available for use in adjusting variable ratio relays of any known type according to load. The invention is not even by implication limited to the specific embodiment illustrated, the scope of the invention being defined solely by the claims.

What is claimed is:

1. A device for adjusting a relay on a car body in accordance with the load sustaining positions of a spring-borne element of a truck which sustains said body, comprising in combination, an abutment displaceable with said spring-borne element; a flexible motion-transmitting connection extending between the car body and truck and having a part movable in the direction of motion of said abutment and engageable therewith to be positioned thereby; a first pressure motor operable to move said connection into said engagement; a stop on the body arranged to move with said connection; relay adjusting means movable in a path substantially concurrent with that of said stop between a no load and a full load position, the stop serving to limit motion of the adjusting means toward full load position; means biasing the adjusting means toward no load position; fluid pressure controlled means for latching said adjusting means in adjusted positions; a second pressure motor incapable of overpowering the first and arranged to shift said adjusting means toward full load position; and a fluid pressure connection in which pressure may be established and dissipated, said fluid pressure connection serving to energize both motors and control the latch.

2. A device for adjusting a relay on a car body in accordance with the load sustaining positions of a spring-borne element of a truck which sustains said body, comprising in combination, an abutment displaceable with said spring-borne element; a flexible motion-transmitting connection extending between the car body and truck and having a part movable in the direction of motion of said abutment and engageable therewith to be positioned thereby; means biasing said motion-transmitting connection away from such engagement; a first pressure motor operable to move said connection into said engagement in opposition to said bias; a stop on the body arranged to move with said connection; relay adjusting means movable in a path substantially concurrent with that of said stop between a no load and a full load position, the stop serving to limit motion of the adjusting means toward full load position; means biasing the adjusting means toward no load position; fluid pressure controlled means for latching said adjusting means in adjusted positions; a second pressure motor incapable of overpowering the first and arranged to shift said adjusting means toward full load position; and a fluid pressure connection in which pressure may be established and dissipated, said fluid pressure connection serving to energize both motors and control the latch, the parts being so arranged that the latch will engage and disengage before the motors are deenergized and energized, respectively.

3. A device for adjusting a relay on a car body in accordance with the load sustaining positions of a spring-borne element of a truck which sustains said body, comprising in combination, an abutment displaceable with said spring-borne element; a flexible motion-transmitting connection extending between the car body and truck and having a part movable in the direction of motion of said abutment and engageable therewith to be positioned thereby; a first pressure motor operable to move said connection into said engagement; a stop on the body arranged to move with said connection; relay adjusting means movable in a path substantially concurrent with that of said stop between a no load and a full load position, the stop serving to limit motion of the adjusting means toward full load position; means biasing the adjusting means toward no load position; fluid pressure controlled means for latching said adjusting means in adjusted positions; a second pressure motor incapable of overpowering the first and arranged to shift said adjusting means toward full load position; and a fluid pressure connection leading to the controlling means of the latch and thence through a portion of the first motor to the second, so arranged that the latch will be shifted by pressure changes in said fluid pressure connection before the motors respond thereto and the first motor must respond at least partially to rising pressure before the second is affected thereby.

4. The combination defined in claim 1 in which the flexible connection is a Bowden wire so arranged that the wire is stressed in tension by the reaction of the first motor.

WAYNE A. BALDWIN.